(12) United States Patent
Lyon

(10) Patent No.: US 10,787,034 B2
(45) Date of Patent: Sep. 29, 2020

(54) PATIENT CARE BED

(71) Applicant: Medical Depot, Inc., Port Washington, NY (US)

(72) Inventor: Gregory Lyon, Mamaroneck, NY (US)

(73) Assignee: Medical Depot, Inc., Port Washington, NY (US)

( * ) Notice: Subject to any disclaimer, the term of this patent is extended or adjusted under 35 U.S.C. 154(b) by 290 days.

(21) Appl. No.: 16/006,469

(22) Filed: Jun. 12, 2018

(65) Prior Publication Data

US 2019/0001747 A1    Jan. 3, 2019

Related U.S. Application Data

(62) Division of application No. 14/856,032, filed on Sep. 16, 2015, now Pat. No. 9,994,072.

(60) Provisional application No. 62/051,586, filed on Sep. 17, 2014.

(51) Int. Cl.
| | |
|---|---|
| *B60B 33/00* | (2006.01) |
| *B60B 33/02* | (2006.01) |
| *A61G 7/05* | (2006.01) |
| *A61G 7/012* | (2006.01) |

(52) U.S. Cl.
CPC ...... *B60B 33/0089* (2013.01); *B60B 33/0092* (2013.01); *B60B 33/021* (2013.01); *A61G 7/012* (2013.01); *A61G 7/05* (2013.01); *A61G 7/0528* (2016.11); *B60B 33/023* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,618,966 A | * | 11/1971 | Vandervest | B60B 33/06 280/43.17 |
| 3,801,122 A | * | 4/1974 | Shoemaker | A47C 3/02 280/43.24 |
| 3,879,796 A | * | 4/1975 | Whyte | A47B 91/02 5/510 |
| 4,104,749 A | | 8/1978 | Grundler | |
| 4,249,282 A | * | 2/1981 | Little | B60B 33/06 16/32 |
| 4,276,962 A | * | 7/1981 | Aulik | A61G 1/04 16/35 R |

(Continued)

*Primary Examiner* — Robert G Santos
*Assistant Examiner* — Rahib T Zaman
(74) *Attorney, Agent, or Firm* — Carter, DeLuca & Farrell LLP

(57) ABSTRACT

A patient care bed including a caster locking mechanism having a foot movable between retracted and extended positions, a lock bar movable from an unlocked to a locked position, a release bar movable from an initial to a release position, and a lock and release assembly. The lock and release assembly includes a guide plate defining a slot, a rocker coupled to the lock bar and including a protrusion slidable within the slot, and a release member coupled to the release bar and including a protrusion slidable within the slot. Moving the lock bar to the locked position slides the protrusion of the rocker through the slot to extend the foot. Moving the release bar to the release position urges the protrusion of the release member through the and into contact with the protrusion of the rocker to urge the protrusion of the rocker back, thereby retracting the foot.

10 Claims, 12 Drawing Sheets

(56) References Cited

U.S. PATENT DOCUMENTS

| | | | |
|---|---|---|---|
| 4,425,673 A | 1/1984 | Werner | |
| 4,472,845 A | 9/1984 | Chivetta et al. | |
| 4,669,136 A * | 6/1987 | Waters | A61G 7/00 177/144 |
| 4,679,261 A | 7/1987 | Stanley et al. | |
| 4,921,295 A | 5/1990 | Stollenwerk | |
| 5,105,486 A | 4/1992 | Peterson | |
| 5,148,562 A | 9/1992 | Borders et al. | |
| 5,347,682 A * | 9/1994 | Edgerton, Jr. | A61G 7/012 16/32 |
| 5,461,740 A | 10/1995 | Pearson | |
| 5,570,485 A | 11/1996 | Kurlander et al. | |
| 5,594,961 A | 1/1997 | Yokoi et al. | |
| 6,209,157 B1 | 4/2001 | Hensley | |
| 6,357,065 B1 | 3/2002 | Adams | |
| 6,405,393 B2 | 6/2002 | Megown | |
| 6,473,922 B1 | 11/2002 | Sommerfeld et al. | |
| 6,520,460 B2 | 2/2003 | Hallberg et al. | |
| 6,578,216 B1 | 6/2003 | Aarestad | |
| 6,601,251 B2 | 8/2003 | Paul | |
| 6,601,271 B1 | 8/2003 | Sommerfeld et al. | |
| 6,643,873 B2 | 11/2003 | Heimbrock et al. | |
| 6,837,665 B2 * | 1/2005 | English, Jr. | A47B 91/002 254/8 R |
| 6,851,144 B2 | 2/2005 | Wang | |
| 6,868,567 B2 | 3/2005 | Edgerton | |
| 6,880,202 B2 | 4/2005 | Thompson et al. | |
| 6,920,656 B2 * | 7/2005 | Roussy | A61G 7/012 16/19 |
| 6,941,600 B2 | 9/2005 | Freeborn et al. | |
| 7,003,828 B2 | 2/2006 | Roussy | |
| 7,013,510 B1 | 3/2006 | Johnson | |
| 7,055,195 B2 | 6/2006 | Roussy | |
| 7,134,155 B2 | 11/2006 | Freeborn et al. | |
| 7,185,377 B2 | 3/2007 | Roussy | |
| 7,237,289 B2 | 7/2007 | Loewenthal | |
| 7,334,277 B2 | 2/2008 | Johnson | |
| 7,509,697 B2 * | 3/2009 | Dorenbeck | A47C 19/045 5/611 |
| 7,584,935 B2 * | 9/2009 | Chen | B25H 1/04 248/647 |
| 7,596,820 B2 | 10/2009 | Nielsen et al. | |
| 7,621,008 B2 * | 11/2009 | Matsuura | A47C 20/041 5/618 |
| 7,631,379 B2 | 12/2009 | Lindner | |
| 7,703,157 B2 * | 4/2010 | Dorenbeck | A61G 7/0528 5/11 |
| 8,191,940 B2 | 6/2012 | Bly et al. | |
| 8,302,257 B2 * | 11/2012 | Lin | B60B 33/0021 16/35 R |
| 8,381,330 B2 * | 2/2013 | Roussy | A61G 7/012 296/20 |
| 8,590,073 B2 * | 11/2013 | Bly | A47C 20/043 16/32 |
| 8,789,662 B2 * | 7/2014 | Childs | A61G 7/0528 16/35 R |
| 8,801,098 B1 | 8/2014 | Richards | |
| 9,089,459 B2 * | 7/2015 | Dindas | A61G 1/0287 |
| 9,994,072 B2 * | 6/2018 | Lyon | B60B 33/0089 |
| 10,130,536 B2 * | 11/2018 | Roussy | A61G 7/002 |
| 2002/0059679 A1 | 5/2002 | Weismiller et al. | |
| 2004/0139545 A1 * | 7/2004 | Reinke | B60B 33/0021 5/86.1 |
| 2005/0210588 A1 | 9/2005 | Loewenthal | |
| 2005/0283911 A1 | 12/2005 | Roussy | |
| 2008/0040857 A1 | 2/2008 | Karmer et al. | |
| 2008/0127418 A1 | 6/2008 | Rawls-Meehan | |
| 2008/0127419 A1 | 6/2008 | Jensen | |
| 2008/0208709 A1 | 8/2008 | Craver | |
| 2009/0019670 A1 * | 1/2009 | Tsai | B60B 33/0081 16/35 R |
| 2009/0064414 A1 | 3/2009 | Andersen et al. | |
| 2011/0138536 A1 | 6/2011 | Wernqvist et al. | |
| 2011/0162145 A1 | 7/2011 | Osborne et al. | |
| 2015/0096846 A1 * | 4/2015 | Lin | B60B 33/021 188/1.12 |

* cited by examiner

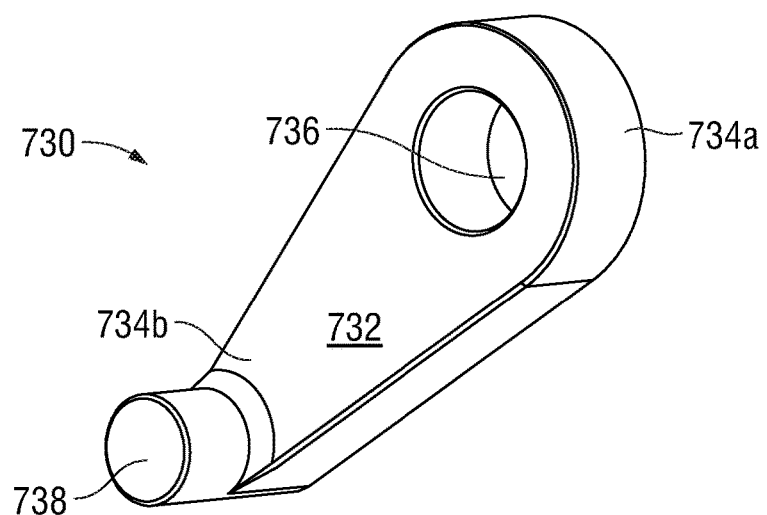
FIG. 13
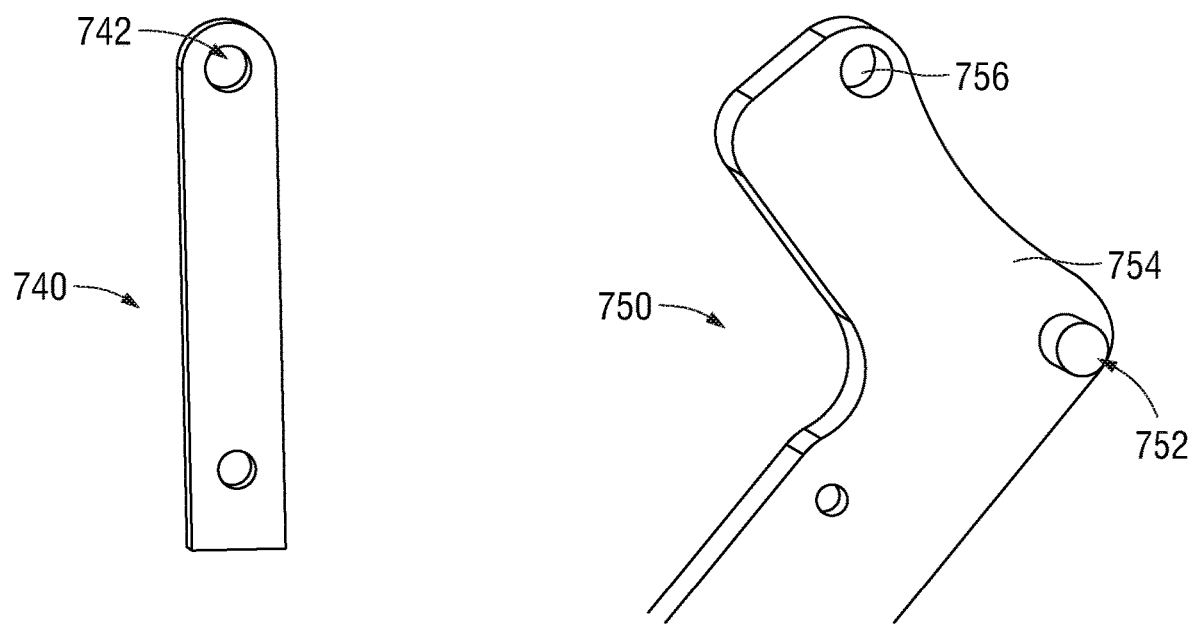
FIG. 14
FIG. 15

PATIENT CARE BED

CROSS-REFERENCE TO RELATED APPLICATIONS

This application is a divisional application of U.S. patent application Ser. No. 14/856,032, filed on Sep. 16, 2015, now U.S. Pat. No. 9,994,072, which claims the benefit of, and priority to, U.S. Provisional Patent Application No. 62/051,586, filed on Sep. 17, 2014, the entire contents of which are hereby incorporated herein by reference.

BACKGROUND

1. Technical Field

The present disclosure relates to patient care beds, and more particularly, to mobile, height-adjustable, and articulatable patient care beds and mechanisms for use therewith.

2. Background of Related Art

Patient care beds are often used in both home care and in more formalized medical settings, e.g., hospital rooms. Such beds generally include a bed frame configured to support a mattress thereon, leg assemblies for supporting the bed frame, and one or more mechanisms for adjusting the height of the bed frame relative to the floor, e.g., to raise/lower the patient and/or for articulating the bed frame, e.g., to position the patient in a lying position, a sitting position, etc. Some patient beds also include casters to facilitate transport of the bed. A lock assembly or assemblies is often included on these mobile patient beds to enable the bed to be locked in position when not being transported.

SUMMARY

To the extent consistent, any of the aspects and features herein may be used in connection with any or all of the other aspects and features detailed herein.

In accordance with aspects of the present disclosure, a caster locking mechanism for a patient care bed is provided including an engagement foot, a lock bar, a release bar, and a lock and release assembly. The engagement foot is movable between a retracted position and an extended position for lifting a caster assembly off of a support surface. The lock bar is movable in a first direction from an unlocked position to a locked position to move the engagement foot from the retracted position to the extended position. The release bar movable in the first direction from an initial position to a release position to move the engagement foot from the extended position back to the retracted position. The lock and release assembly includes a guide plate, a rocker, and a release member. The guide plate defines a lock and release slot. The rocker includes a protrusion slidably disposed within the lock and release slot. The rocker is operably coupled to the lock bar such that moving the lock bar from the unlocked position to the locked position slides the protrusion of the rocker through the lock and release slot from a first position to a second position to lock the lock bar in the locked position and the engagement foot in the extended position. The release member includes a protrusion slidably disposed within the lock and release slot. The release member is operably coupled to the release bar such that movement of the release bar from the initial position to the release position slides the protrusion of the release member through the lock and release slot and into contact with the protrusion of the rocker to urge the protrusion of the rocker from the second position back to the first position, thereby returning the lock bar to the unlocked position and the engagement foot to the retracted position.

In aspects of the present disclosure, the lock and release slot defines a L-shaped configuration having a vertical portion and a horizontal portion. In such aspects, moving the lock bar from the unlocked position to the locked position slides the protrusion of the rocker from a closed end of the vertical portion of the lock and release slot, through the vertical portion of the lock and release slot, and into the horizontal portion of the lock and release slot to lock the lock bar in the locked position and the engagement foot in the extended position.

In aspects of the present disclosure, movement of the release bar from the initial position to the release position slides the protrusion of the release member from a closed end of the horizontal portion of the lock and release slot through the horizontal portion of the lock and release slot and into contact with the protrusion of the rocker to urge the protrusion of the rocker from the horizontal portion of the lock and release slot to the vertical portion of the lock and release slot, thereby returning the lock bar to the unlocked position and the engagement foot to the retracted position.

In aspects of the present disclosure, the lock bar is biased towards the unlocked position such that the protrusion of the rocker is biased towards the closed end of the vertical portion of the lock and release slot once disposed within the vertical portion of the lock and release slot, thereby returning the lock bar to the unlocked position and the engagement foot to the retracted position once the protrusion of the rocker is disposed in the vertical portion of the lock and release slot.

In aspects of the present disclosure, the lock bar includes a yoke pivotably coupled to the guide plate at a first location along the yoke via a first pin.

In aspects of the present disclosure, a second pin is pivotably coupled to the yoke at a second location along the yoke. In such aspects, the second pin is slidably disposed within a guide slot defined within the guide plate.

In aspects of the present disclosure, the rocker is pivotably coupled to the yoke at the second location along the yoke via the second pin.

In aspects of the present disclosure, a leg defining a first end and a second end is provided. The first end of the leg is pivotably coupled to the yoke at the second location along the yoke via the second pin and the second end of the leg is coupled to the engagement foot.

In aspects of the present disclosure, the release member is fixedly engaged to the release bar and pivotably coupled to the guide plate via a third pin.

In aspects of the present disclosure, the guide plate is configured to fixedly engage a base bar of a leg assembly of a patient care bed.

A patient care bed provided in accordance with aspects of the present disclosure includes a fixed frame defining a head end and a foot end and first and second leg assemblies coupled to the head end and foot end, respectively, of the fixed frame. Each leg assembly includes a pair of spaced-apart caster assemblies configured to support the leg assembly on a support surface, e.g., the floor. An engagement foot is associated with each of the caster assemblies of the first leg assembly or the second leg assembly. Each engagement foot is movable between a retracted position and an extended position for lifting the corresponding caster assembly off of the support surface. The patient care bed further includes a lock and release assembly associated with each engagement foot, a lock bar operably coupled to and extending between the lock and release assemblies, and a release bar operably coupled to and extending between the lock and release assemblies. The lock bar is movable in a first direction from an unlocked position to a locked position to move the engagement feet from the retracted position to the extended position. The release bar is movable in the first direction from an initial position to a release position to move the engagement feet from the extended position back to the retracted position. Each of the lock and release assemblies may be configured similarly as detailed above with respect to any of the previous aspects.

BRIEF DESCRIPTION OF THE DRAWINGS

Various aspects and features of the presently disclosed patient care bed and mechanisms for use therewith are described with reference to the accompanying drawing figures, wherein like references characters identify similar or identical elements and:

FIG. 13 is a perspective view of the rocker of the caster locking mechanism of FIG. 9;

FIG. 14 is a perspective view of the leg of the caster locking mechanism of FIG. 9; and FIG. 15 is a perspective view of a portion of the release bar of the caster locking mechanism of FIG. 9.

DETAILED DESCRIPTION

Figure 1:
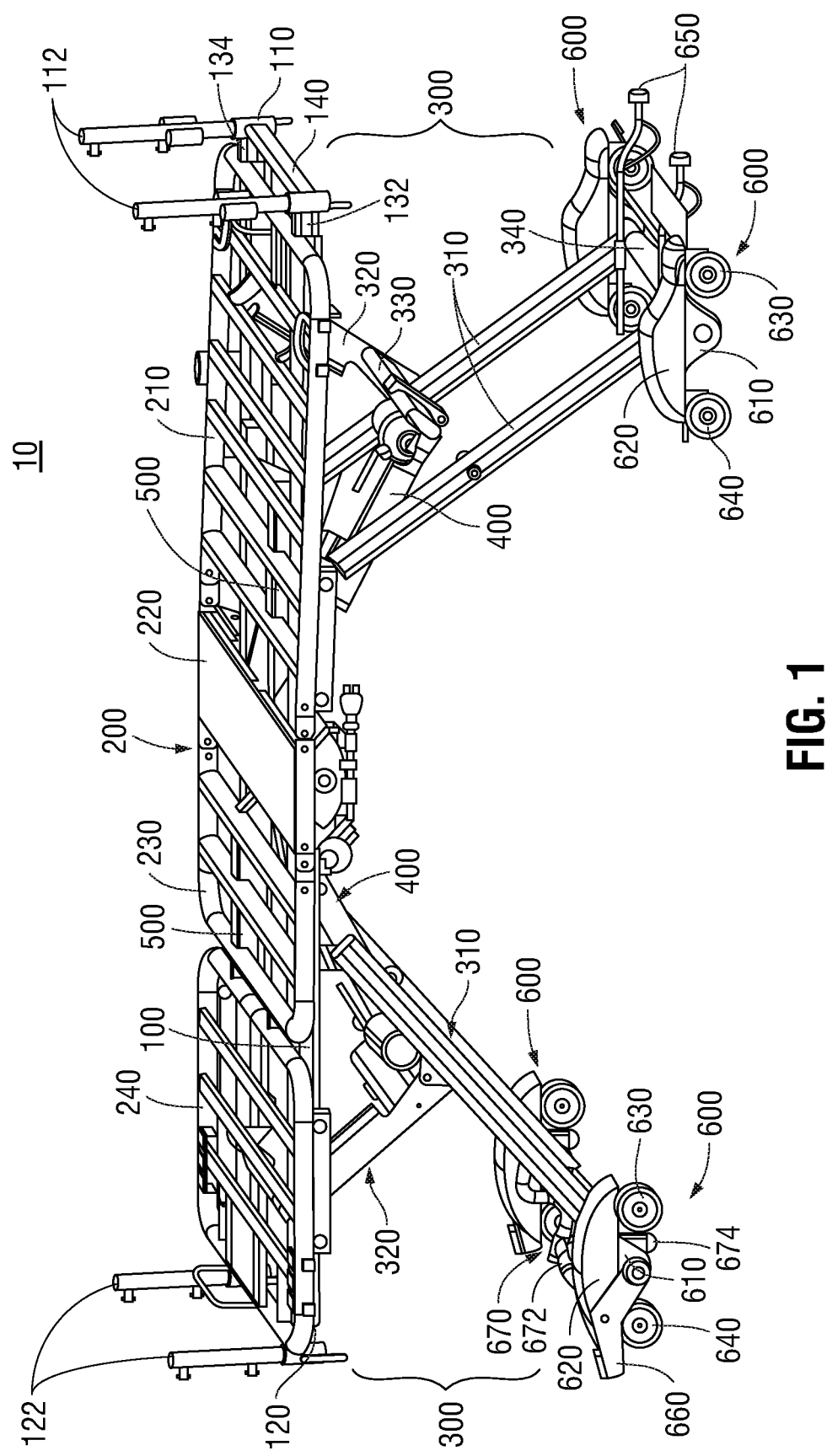
FIG. 1 is a top, perspective view of a patient care bed provided in accordance with the present disclosure, with one of the stabilizers of each leg assembly removed.
Figure 2:
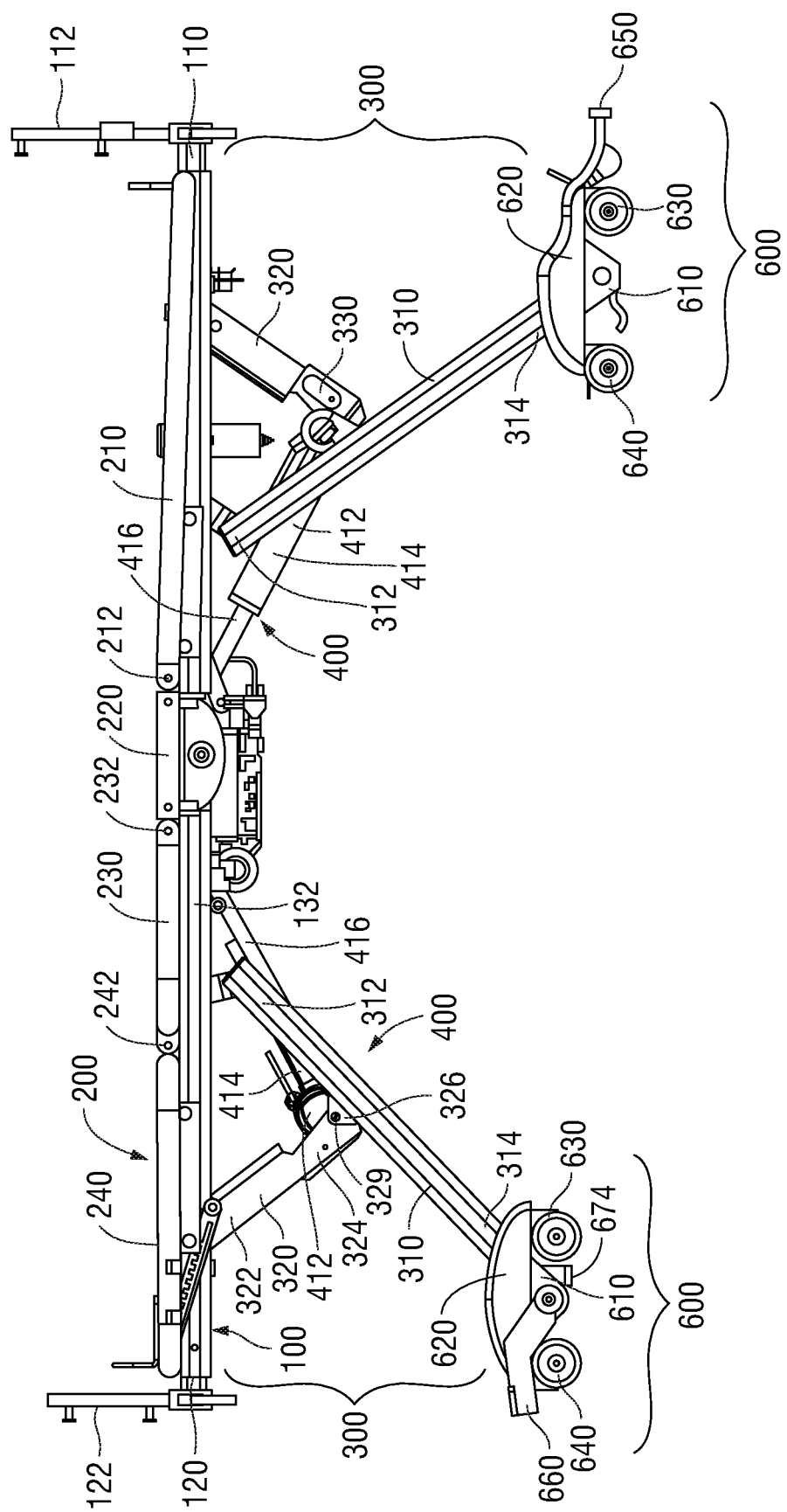
FIG. 2 is a side view of the patient care bed of FIG. 1, with one of the stabilizers of each leg assembly removed.
Figure 3:
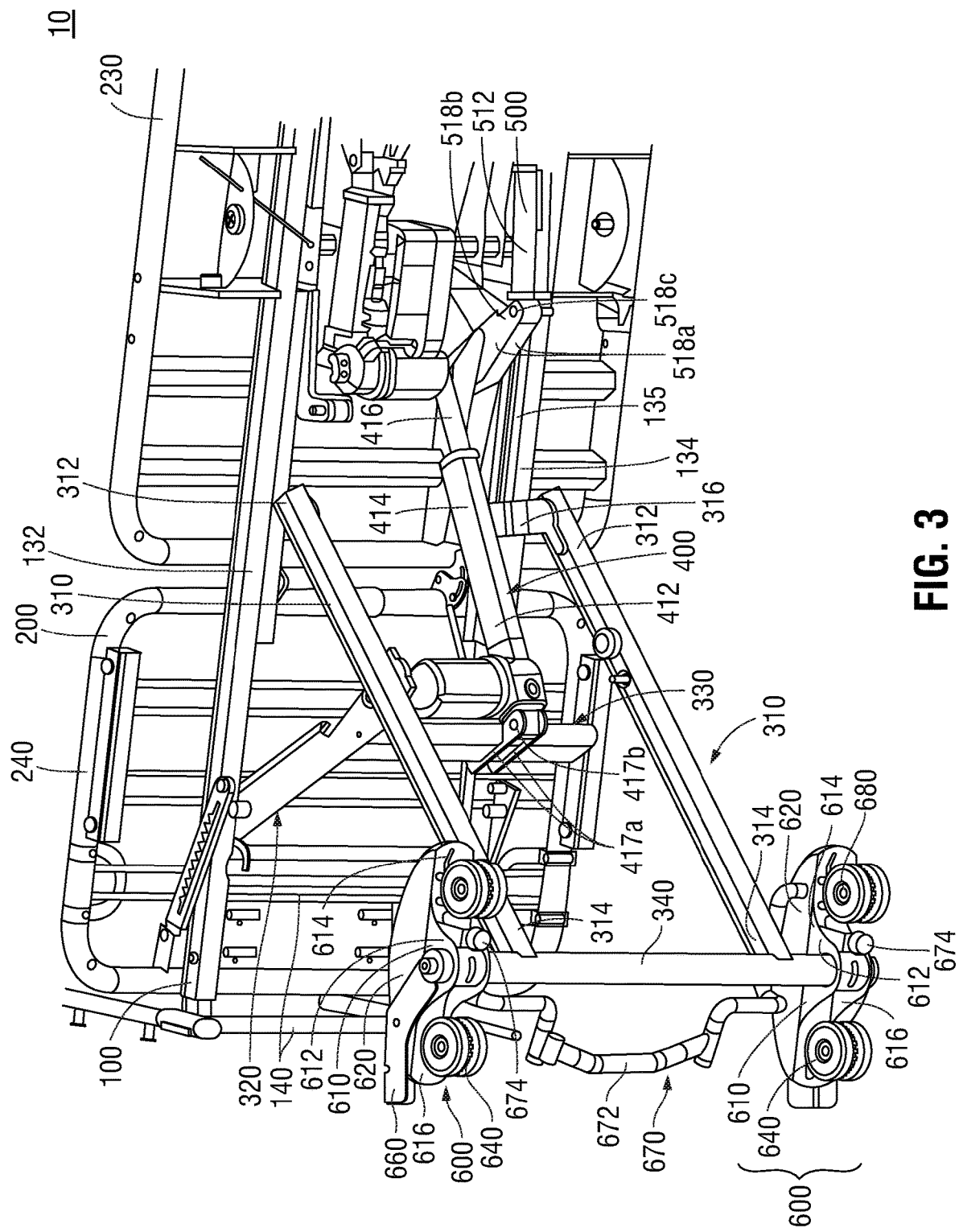
FIG. 3 is a bottom, perspective view of a portion of the patient care bed of FIG. 1 with one of the stabilizers of the illustrated leg assembly removed.

Turning now to FIGS. 1-3, a patient care bed provided in accordance with the present disclosure is shown generally identified by reference numeral 10. Bed 10 is particularly suitable for long term care, although bed 10 may also find application in short term care, and/or may be used in both hospital settings as well as in private home care settings. Bed 10 generally includes a fixed frame 100, an articulatable frame 200 articulatably mounted on fixed frame 100, a pair of leg assemblies 300 coupled to fixed frame 100 and extending downwardly therefrom, a pair of height adjustment actuator assemblies 400, and a pair of articulation actuator assemblies 500. Bed 10 further includes a pair of caster assemblies 600 coupled to the lower end of each leg assembly 300 on each side thereof to facilitate transport of bed 10.

Fixed frame 100 includes a head end 110, a foot end 120, and is defined by a pair of spaced-apart longitudinal side beams 132, 134 extending between the head and foot ends 110, 120, respectively, of fixed frame 100, although other suitable configurations are also contemplated. One or more cross-beams 140 extends transversely between side beams 132, 134 to provide structural support to fixed frame 100. Fixed frame 100 further includes head end brackets 112 and foot end brackets 122 configured to support a head board (not shown) and a foot board (not shown), respectively, at the head and foot ends 110, 120, respectively, thereof As detailed below, leg assemblies 300 are operably coupled to fixed frame 100 to enable height adjustment of fixed frame 100 relative to a support surface, e.g., the floor.

Articulatable frame 200 includes a plurality of sections 210, 220, 230, 240 pivotably coupled to one another and/or fixed frame 100 to enable movement at least between a substantially flat or lying position, a seated position, a legs raised position, and a seated and legs raised position. More specifically, articulatable frame 200 includes a back section 210, a hip section 220, a thigh section 230, and a foot section 240, although greater or fewer than four (4) sections and/or different configurations of sections 210-240 are also contemplated. Hip section 220 is fixedly secured to fixed frame 100. Back section 210 is pivotably coupled to hip section 220 about a first pivot 212 and is positioned adjacent to hip section 220 towards head end 110 of fixed frame 100. A first articulation actuator assembly 500 is operably coupled to back section 210 to enable articulation of back section 210 relative to fixed frame 100, as detailed below. Thigh section 230 is pivotably coupled to hip section 220 about a second pivot 232 and is positioned adjacent to hip section 220 towards foot end 120 of fixed frame 100. A second articulation actuator assembly 500 is operably coupled to thigh section 230 to enable articulation of thigh section 230 relative to fixed frame 100, as also detailed below. Foot section 240 is pivotably coupled to thigh section 230 about a third pivot 242 towards foot end 120 of fixed frame 100. Foot section 240 is not directly coupled to fixed frame 100, but, rather, is both pivotable and movable relative thereto in response to pivoting of thigh section 230.

Figure 4:
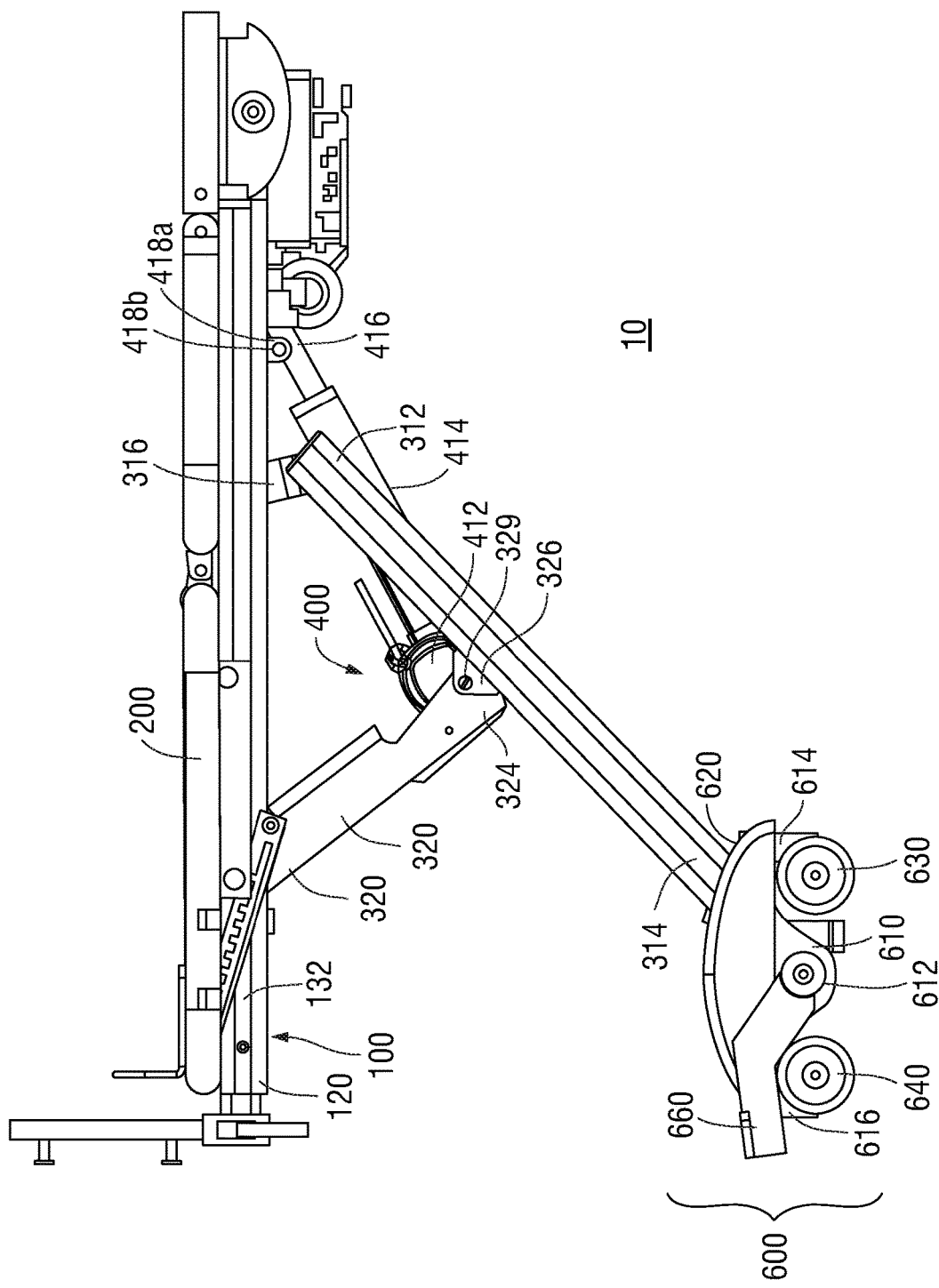
FIG. 4 is a side view of the portion of the patient care bed shown in FIG. 3.
Figure 5:
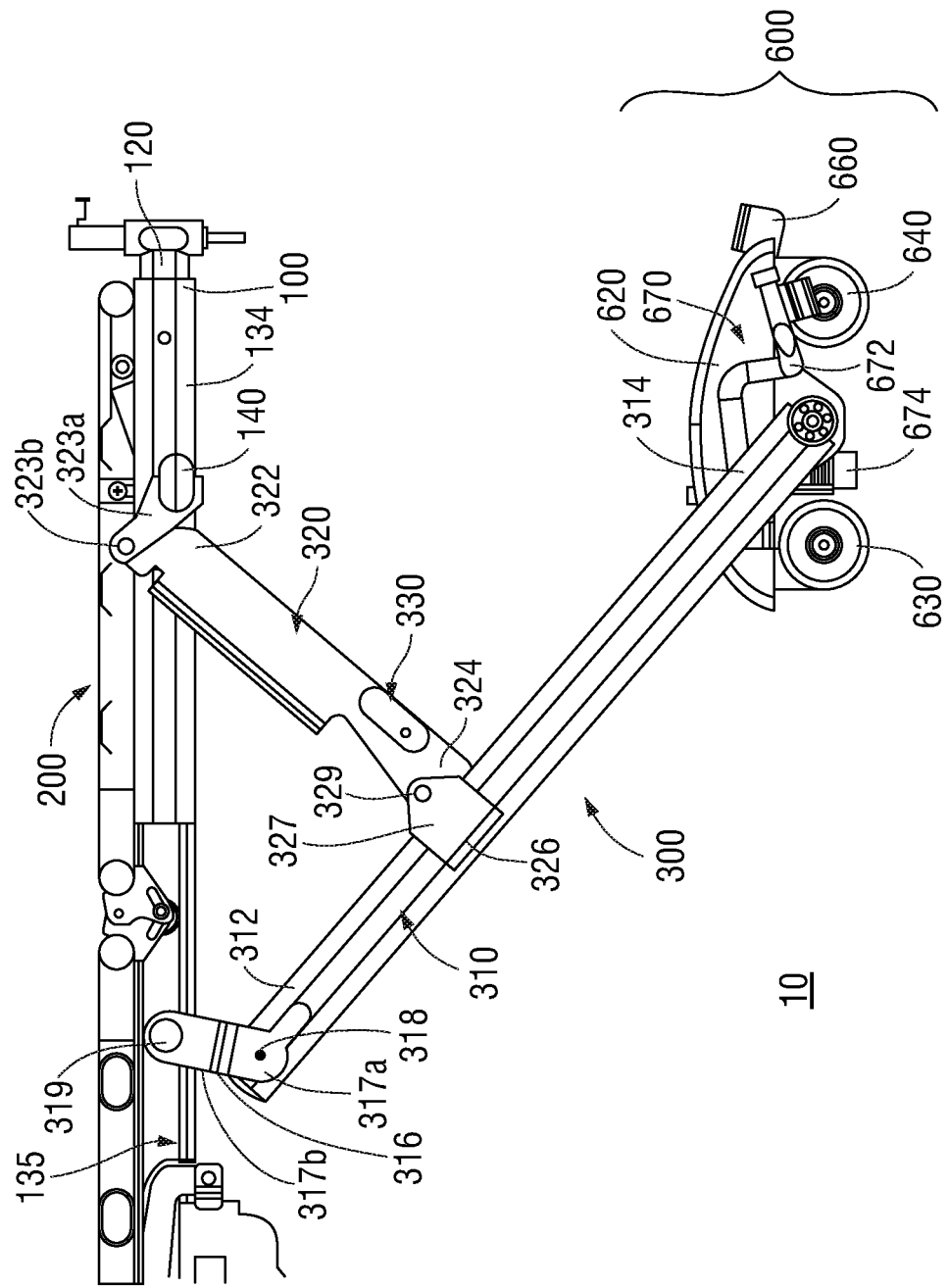
FIG. 5 is a side, cross-sectional view of another portion of the patient care bed of FIG. 1.
Figure 6:
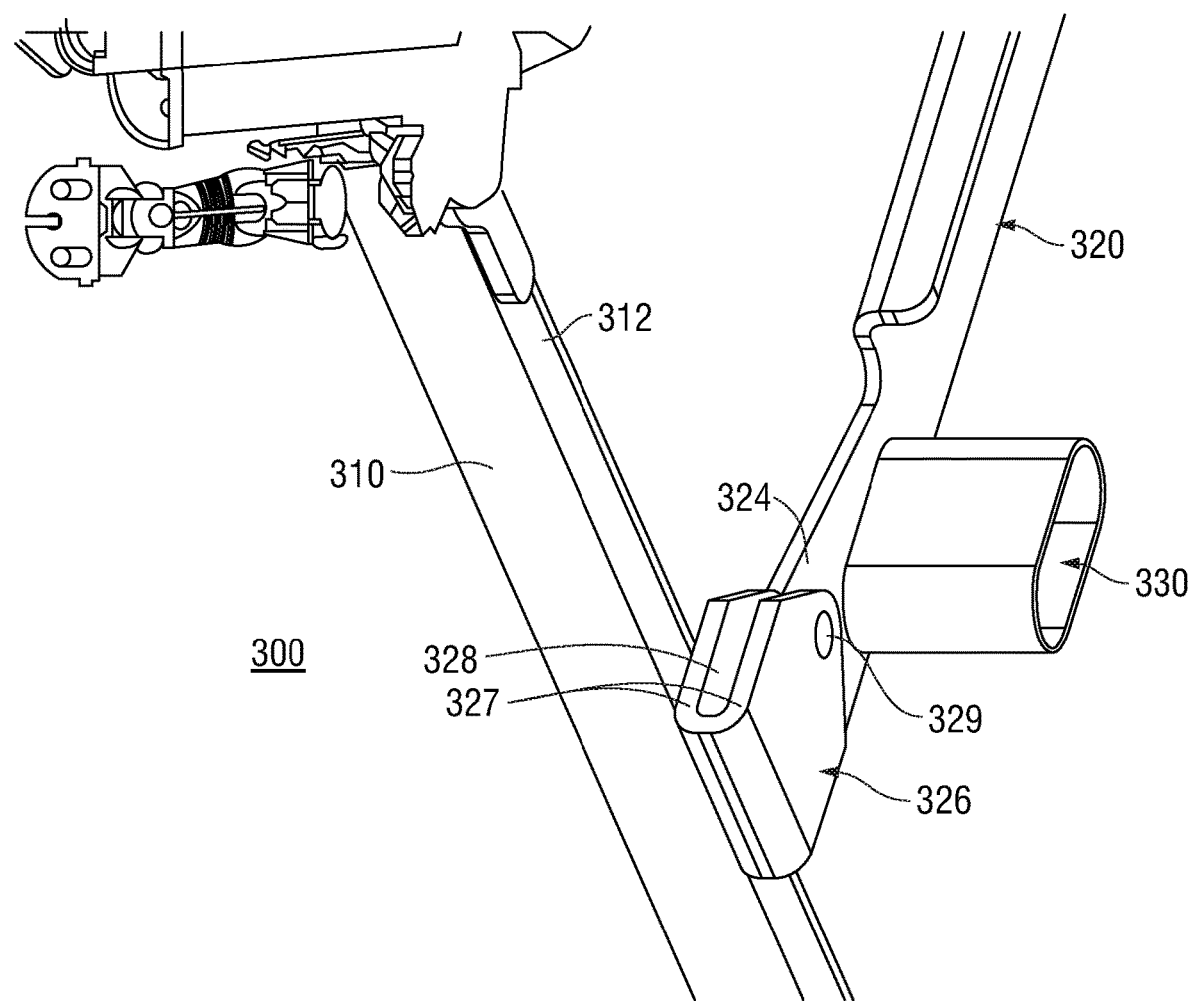
FIG. 6 is an enlarged, perspective view of another portion of the patient care bed of FIG. 1 illustrating the coupling between one of the leg members of the patient care bed and the stabilizer associated therewith.

With reference to FIGS. 4-6, in conjunction with FIGS. 1-3, each leg assembly 300 and corresponding height adjustment actuator assembly 400 pair is substantially similar and, thus, reference below will only be made to one of the leg assemblies 300 and the corresponding height adjustment actuator assembly 400 thereof. It is envisioned that leg assemblies 300 and the corresponding height adjustment actuator assemblies 400 thereof be operable in conjunction with one another, e.g., to raise and lower fixed frame 100 relative to the floor or other support surface in generally parallel orientation relative to the floor or other support surface, and/or that leg assemblies 300 and the corresponding height adjustment actuator assemblies 400 be operable independently of one another, e.g., to achieve the Trendelenburg and reverse-Trendelenburg positions.

Leg assembly 300 includes a pair of leg members 310, a pair of leg stabilizers 320, a cross bar 330, and a base bar 340. Leg members 310 are spaced-apart and disposed on either side of fixed frame 100, e.g., adjacent longitudinal side beams 132, 134, respectively. Each leg member 310 defines an upper end 312 and a lower end 314. The upper end 312 of each leg member 310 is slidably and rotatably coupled to one of the longitudinal side beams 132, 134 of fixed frame 100. More specifically, a linkage 316 couples the upper end 312 of each leg member 310 to the corresponding longitudinal side beam 132, 134. Linkage 316 defines a first end 317a that is pivotably coupled to the upper end 312 of the corresponding leg member 310 via a pivot pin 318. Linkage 316 further defines a second end 317b having a roller 319 mounted thereon. Roller 319 is captured within a track 135 defined within the corresponding longitudinal side beam 132, 134 to rotatably and slidably couple linkage 316 and, thus, leg member 310, to the longitudinal side beam 132, 134 of fixed frame 100. In use, as detailed below, outward sliding of rollers 319 through tracks 135 of longitudinal side beams 132, 134, e.g., towards the adjacent end 110, 120 of fixed frame 100, urges leg members 310 of leg assembly 300 to pivot relative to fixed frame 100 so as to raise fixed frame 100 (or the end thereof, where only one leg assembly 300 is urged to pivot) relative to a support surface, e.g., the floor, while inward sliding of rollers 319 through tracks 135 of longitudinal side beams 132, 134, e.g., towards the center of fixed frame 100, urges leg members 310 of leg assembly 300 to pivot relative to fixed frame 100 so as to lower fixed frame 100 (or the end thereof, where only one leg assembly 300 is urged to pivot) relative to a support surface, e.g., the floor.

Continuing with reference to FIGS. 4-6, in conjunction with FIGS. 1-3, a leg stabilizer 320 (only one of which is shown for each leg assembly 300) is associated with each leg member 310 and operably coupled between that leg member 310 and the corresponding longitudinal side beam 132, 134 of fixed frame 100. Each leg stabilizer 320 defines an upper end 322 and a lower end 324. The upper end 322 of each leg stabilizer 320 is pivotably engaged to one of the cross-beams 140 of fixed frame 100 adjacent the corresponding side beam 132, 134 of fixed frame 100 via a linkage 323a and pivot pin 323b. The lower end 324 of each leg stabilizer 320 is pivotably coupled to an intermediate portion of the corresponding leg member 310 via a U-bracket 326. More specifically, a U-bracket 326 is fixed, e.g., welded or otherwise secured, to the corresponding leg member 310 intermediate the upper and lower ends 312, 314, respectively, thereof. Each U-bracket 326 includes a pair of uprights 327 defining a slot 328 therebetween that is configured to receive the lower end 324 of the corresponding leg stabilizer 320. A pivot pin 329 extends through the uprights 327 of each U-bracket 326 and an aperture (not explicitly shown) defined transversely through the lower end 324 of the corresponding leg stabilizer 320 to pivotably engage the lower end 324 of the leg stabilizer 320 within the U-bracket 326, thereby pivotably coupling the lower end 324 of each leg stabilized 320 with the corresponding leg member 310. As a result of this configuration, wherein the lower end 324 of each leg stabilizer 320 is received within the U-bracket 326 of the corresponding leg member 310, cantilevered forces that would result from a single support configuration are reduced if not eliminated.

Cross bar 330 of leg assembly 300 is engaged with and extends between the stabilizers 320 of leg assembly 300 so as to provide structural support thereto. As detailed below, cross bar 330 is configured to support an end of the corresponding height adjustment actuator assembly 400 thereon. Base bar 340 is engaged with and extends between lower ends 314 of leg members 310 so as to connect the spaced-apart leg members 310 of the leg assembly 300. As also detailed below, a caster assembly 600 is disposed at each end of base bar 340 to enable transport of bed 10 along a support surface, e.g., the floor.

Referring still to FIGS. 4-6, in conjunction with FIGS. 1-3, each height adjustment actuator assembly 400 is configured to transition one of the leg assemblies 300 between a lowered position and a raised position to thereby raise or lower fixed frame 100 (or an end thereof, where only one height adjustment actuator assembly 400 and corresponding leg assembly 300 are operated) relative to a support surface, e.g., the floor. As illustrated and described herein, two height adjustment actuator assemblies 400 are provided, one for each leg assembly 300, although other configurations are also contemplated. These height adjustment actuator assemblies 400 may be operable in conjunction with one another and/or independently of one another, depending on a particular purpose. As noted above, the height adjustment actuator assemblies 400 corresponding to each of the leg assemblies 300 are substantially similar and, thus, reference below will only be made to one height adjustment actuator assembly 400.

Height adjustment actuator assembly 400 includes a push-pull actuator 412 having an actuator base 414 and an actuator arm 416 telescopically extendable/retractable relative to actuator base 414. Actuator base 414 is pivotably coupled to cross bar 330 of leg assembly 300 between the leg members 310 of leg assembly 300. More specifically, one or more brackets 417a are fixedly mounted on cross bar 330 and pivotably engaged with actuator base 414 via a pivot pin 417b so as to engage actuator base 414 with cross bar 330 while still enabling pivoting of actuator base 414 relative to cross bar 330. The free end of actuator arm 416 is pivotably engaged with a bracket 418a that is fixedly mounted on one of the cross-beams 140 of fixed frame 100 via a pivot pin 418b to pivotably couple the free end of actuator arm 416 with fixed frame 100.

Extension of actuator arm 416 relative to actuator base 414 pushes cross bar 330 away from actuator 412. Such movement of cross bar 330, in turn, translates rollers 319 at the upper ends 312 of leg members 310 through through tracks 135 of longitudinal side beams 132, 134 of fixed frame 100, and pivots leg members 310 and stabilizers 320 relative to fixed frame 100 to raise fixed frame 100 relative to a support surface, e.g., the floor. Retraction of actuator arm 416 relative to actuator base 414, on the other hand, pulls cross bar 330 towards actuator 412. This movement of cross bar 330, in turn, translates rollers 319 in the opposite direction through tracks 135 of longitudinal side beams 132, 134 of fixed frame 100, and pivots leg members 310 and stabilizers 320 in the respective opposite directions to lower fixed frame 100 relative to a support surface, e.g., the floor.

Figure 7:
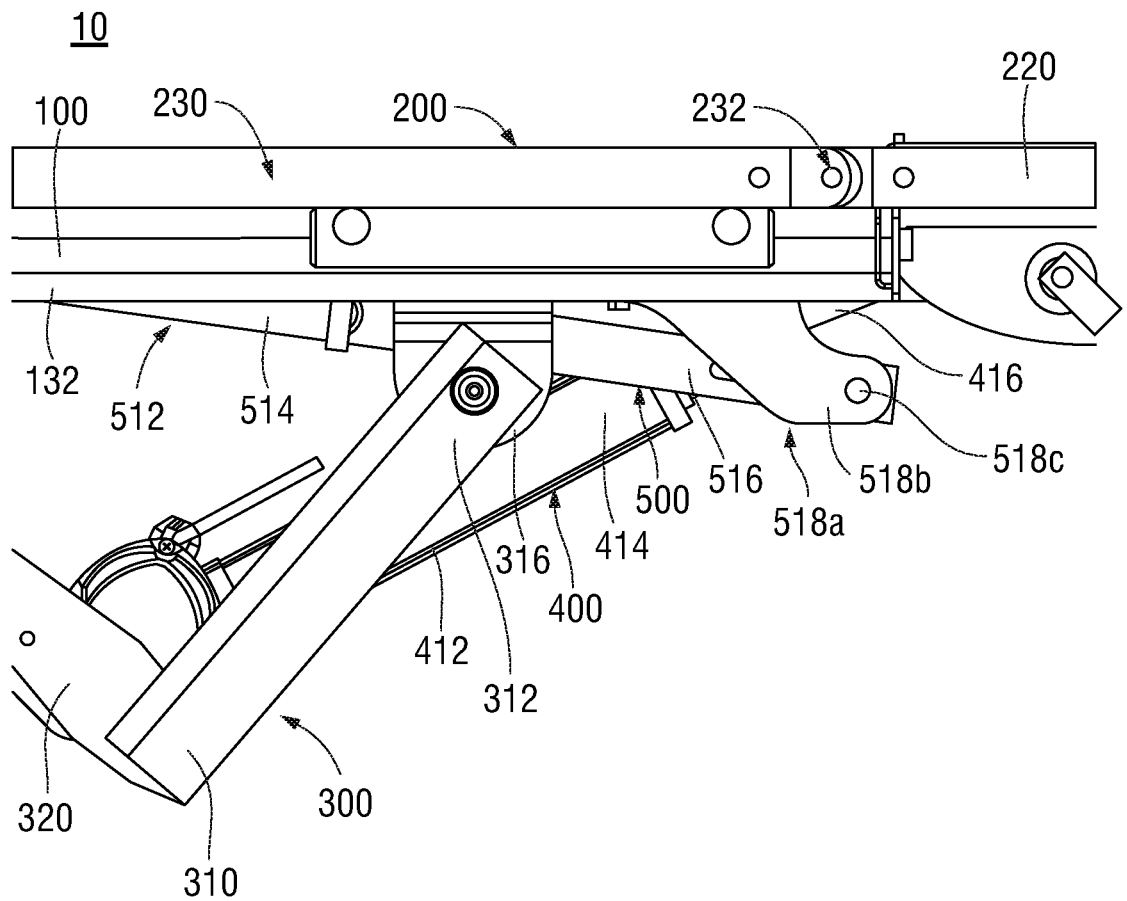
FIG. 7 is an enlarged, perspective view of another portion of the patient care bed of FIG. 1 illustrating coupling between one of the articulatable sections of the patient care bed and the actuator associated therewith.
Figure 8:
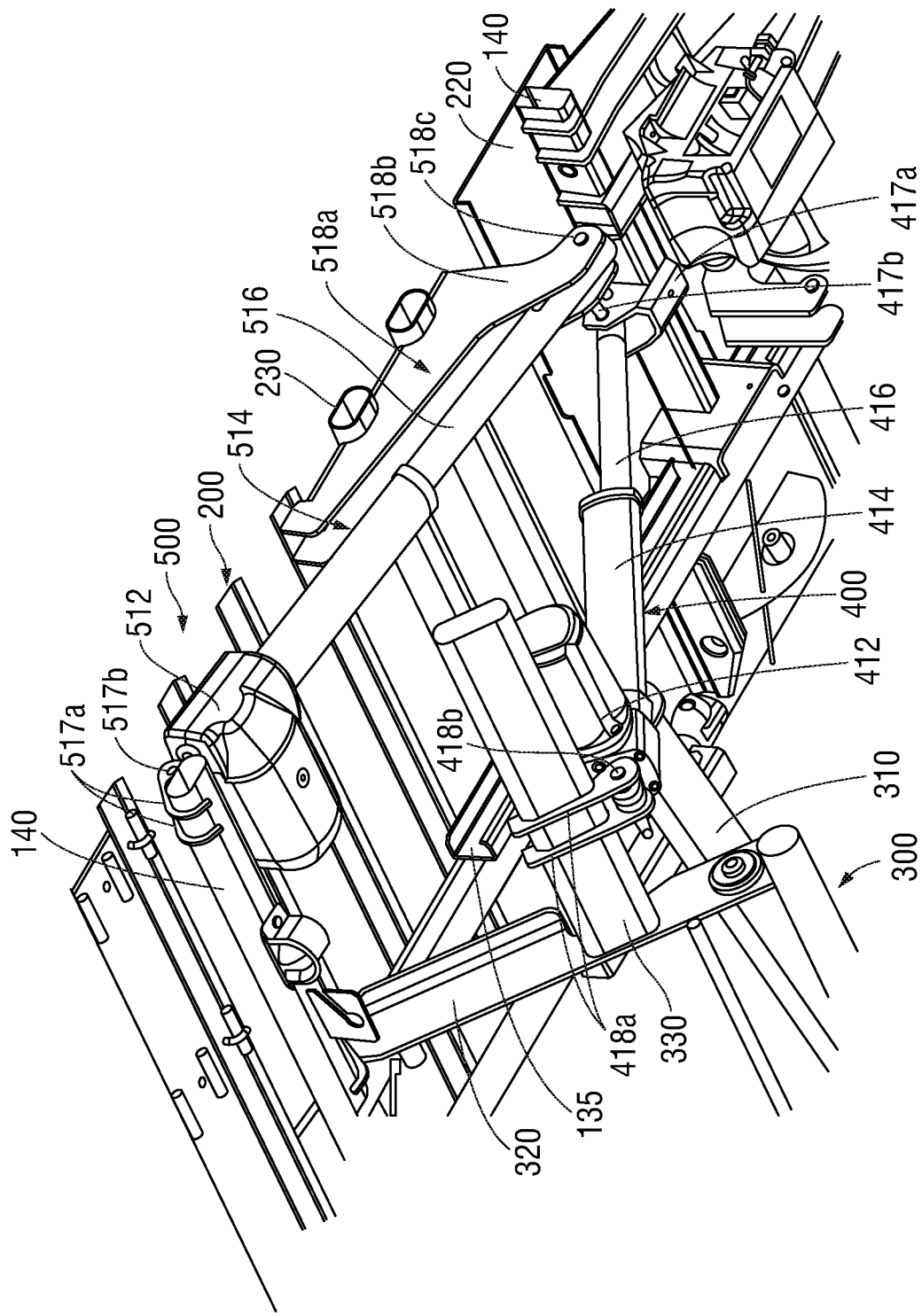
FIG. 8 is an enlarged, perspective view of another portion of the patient care bed of FIG. 1 illustrating the operable connections between the articulatable section of FIG. 7 and the actuator associated therewith, with one of the stabilizers of the illustrated leg assembly removed.

Referring to FIGS. 7 and 8, in conjunction with FIGS. 1-3, with respect to articulating articulatable frame 200, as noted above, a first articulation actuator assembly 500 is operably coupled to back section 210 to enable articulation of back section 210 relative to fixed frame 100, while a second articulation actuator assembly 500 is operably coupled to thigh section 230 to enable articulation of thigh section 230 relative to fixed frame 100. The features and use of articulation actuator assemblies 500 are substantially similar to one another and, thus, only the articulation actuator assembly 500 associated with thigh section 230 is described herein below.

Articulation actuation assembly 500 includes a push-pull actuator 512 having an actuator base 514 and an actuator arm 516 telescopically extendable/retractable relative to actuator base 514. Actuator base 514 is pivotably coupled to one of the cross-beams 140 of fixed frame 100. More specifically, one or more brackets 517a are fixedly mounted on the cross-beam 140 pivotably engaged with actuator base 514 via a pivot pin 517b so as to enable pivoting of actuator base 514 relative to cross-beam 140. Actuator arm 516 is pivotably coupled to thigh section 230 of articulatable frame 200 by way of first and second deck brackets 518a. Each deck bracket 518a is fixedly engaged with several slats of thigh section 230 of articulatable frame 200 to ensure sufficient engagement therewith and to provide a plurality of pushing/pulling points at which deck brackets 518a push/pull thigh section 230 of articulatable frame 200 to articulate thigh section 230 relative to fixed frame 100. Each deck bracket 518a further includes an extension 518b extending downwardly therefrom. A pivot pin 518c extends between the extension 518b of each deck bracket 518a and an aperture (not shown) defined transversely through the free end of actuator arm 516 of articulation actuation assembly 500 to pivotably couple the free end of actuator arm 516 with deck brackets 518a and, thus, with thigh section 230 of articulatable frame 200. Extensions 518b serve to offset pivot pin 518c relative to second pivot 232, about which thigh section 230 pivots relative to hip section 220 of articulatable frame 200 and fixed frame 100, such that extension/retraction of push-pull actuator 512 pivots thigh section 230 about pivot 232 relative to hip section 220. In particular, extension of push-pull actuator 512 pivots thigh section 230 upwardly, e.g., towards an articulated position relative to hip section 220, while retraction of push-pull actuator 512 pivots thigh section 230 downwardly, e.g., towards a flat position relative to hip section 220.

Referring to FIGS. 1-4, a plurality of caster assemblies 600 configured for use with bed 10 are provided. More specifically, a caster assembly 600 is coupled to each leg member 310 of each leg assembly 300 at opposed ends of base bars 340 of leg assemblies 300 to provide four caster assemblies 600 positioned adjacent the four corners of the generally rectangular-shaped bed 10. As can be appreciated, this configuration provides a stable, balanced arrangement when bed 10 is both stationary and in transport. All of the caster assemblies 600 shaft a common general configuration and features. However, the caster assemblies 600 associated with the leg assembly 300 disposed towards the head end 110 of fixed frame 100 do include differences from those associated with the leg assembly 300 disposed towards the foot end 120 of fixed frame 100 of bed 10. Thus, common aspects of all caster assemblies 600 will first be described, followed by a description of the differences between the head end caster assemblies 600 and the foot end caster assemblies 600.

Each caster assembly 600 generally includes a body 610, a cover 620, and first and second casters 630, 640. The body 610 of each caster assembly 600 includes a central portion 612 and first and second wings 614, 616 extending outwardly from opposed sides of central portion 612. Central portion 612 is configured to pivotably engage body 610 with the base bar 340 of the corresponding leg assembly 300. First and second wings 614, 616 are configured to operably engage first and second casters 630, 640, respectively, so as to enable rotation of first and second casters 630, 640 relative to body 610 to translate bed 10 along a support surface, e.g., the floor. The cover 620 of each caster assembly 600 is disposed about the body 610 thereof to substantially cover the internal components and connections thereof, thus preventing material from inadvertently interfering with the operation of the caster assembly 600.

Each of the caster assemblies 600 associated with the leg assembly 300 disposed towards the head end 110 of fixed frame further includes a wall bumper 650 extending therefrom. Wall bumpers 650 extend beyond the head end 110 of fixed frame 100 so as to first contact a wall and thereby inhibit head end 110 of fixed frame from contacting the wall. As can be appreciated, such a configuration inhibits damage to the wall as well as to bed 10 and/or the patient using bed 10.

The first and second casters 630, 640 of the caster assemblies 600 associated with the leg assembly 300 disposed towards the foot end 120 of fixed frame are operably engaged with the respective wings 614, 616 so as to enable swiveling of first and second casters 630, 640 relative to body 610, in addition to rotation thereof. As a result of this configuration, directional steering of bed 10 during translation thereof along a support surface, e.g., the floor, is enabled. Each of these caster assemblies 600 further includes a directional lock 660 movable between a raised position and a lowered position. In the raised position, directional locks 660 permit swiveling of first and second casters 630, 640, while, in the lowered position, directional locks 670 surround first and second casters 630, 640 so as to inhibit swiveling thereof.

The caster assemblies 600 associated with the leg assembly 300 disposed towards the foot end 120 of fixed frame 100 further include a locking mechanism 670 operably associated therewith. Locking mechanism 670 includes a lock bar 672 extending between the caster assemblies 600 at the foot end 120 of fixed frame 100, and an engagement foot 674 disposed between the first and second casters 630, 640 of each of the caster assemblies 600 at foot end 120. Lock bar 672 is operably coupled to engagement feet 674 such that, upon a first depression of lock bar 672, engagement feet 674 are extended downwardly from caster assemblies 600 so as to contact the support surface, e.g., the floor, and raise caster assemblies 600 off of the support surface. Upon a second depression of lock bar 672, on the other hand, engagement feet 674 are raised such that casters 630, 640 are returned to the support surface to enable translation of bed 10 therealong. Another locking mechanism configured for use with bed 10, or any other suitable patient care bed, is detailed below with respect to FIGS. 9-15.

Figure 9:
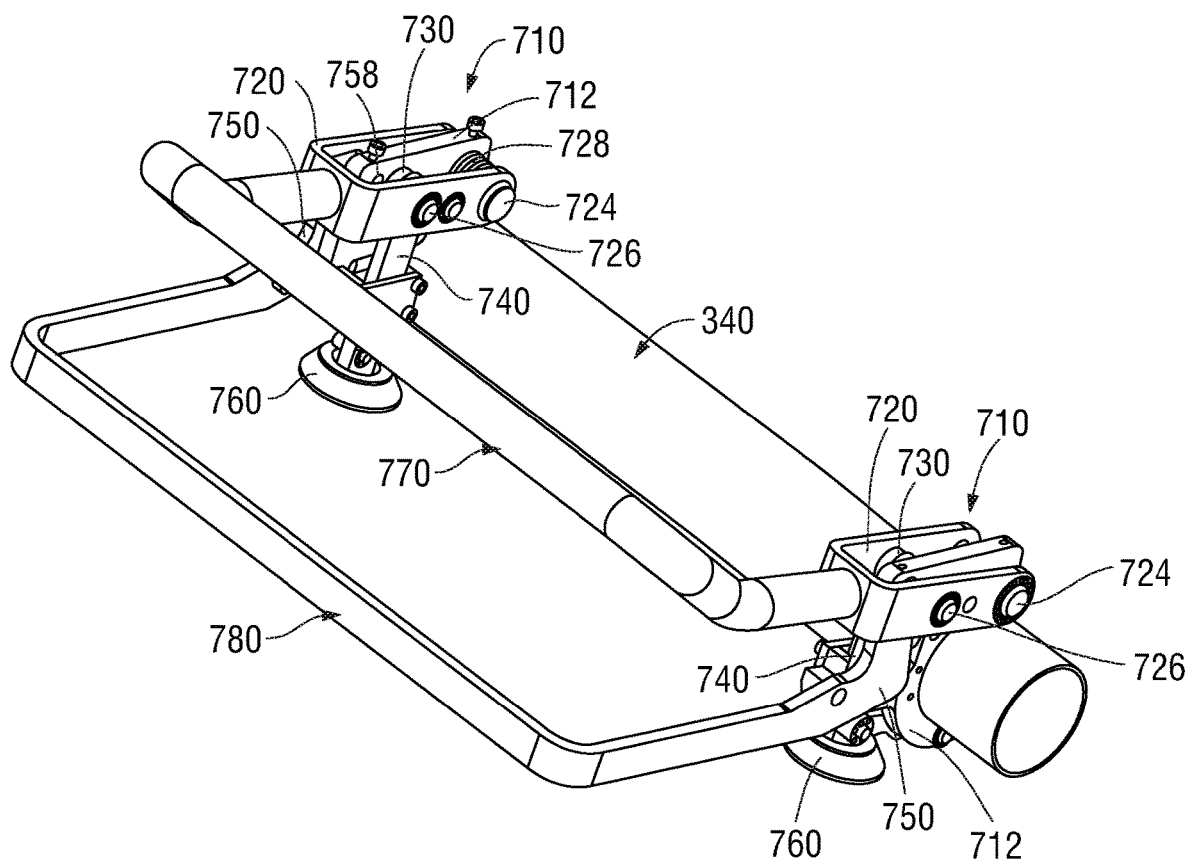
FIG. 9 is a perspective view of a caster locking mechanism provided in accordance with the present disclosure and configured for use with the patient care bed of FIG. 1 or any other suitable patient care bed.

Turning now to FIGS. 9-15, and initially to FIG. 9, a caster locking mechanism 700 provided in accordance with the present disclosure is shown. Caster locking mechanism 700 is coupled to the base bar 340 of one of the leg assemblies 300 of bed 10 (FIG. 1), e.g., the leg assembly 300 adjacent the foot end 120 of bed 10 (see FIG. 1), although it is also contemplated that caster locking mechanism 700 be configured for use with the leg assembly of any other suitable patient care bed.

Caster locking mechanism 700 includes a pair of lock and release assemblies 710, an engagement foot 760 associated with each lock and release assembly 710, a lock bar 770, and a release bar 780. With additional reference to FIGS. 10-14, each lock and release assembly 710 is disposed at an end of the base bar 340 of one of the leg assemblies 300 of bed 10 adjacent the caster assembly 600 thereof (see FIG. 1). Each lock and release assembly 710 includes a guide plate 712, a yoke 720 of the lock bar 770, a rocker 730, a leg 740, and a release member 750 of the release bar 780. The lock and release assemblies 710 are similar to one another and, thus, only one lock and release assembly 710 will be detailed below.

Figure 10:
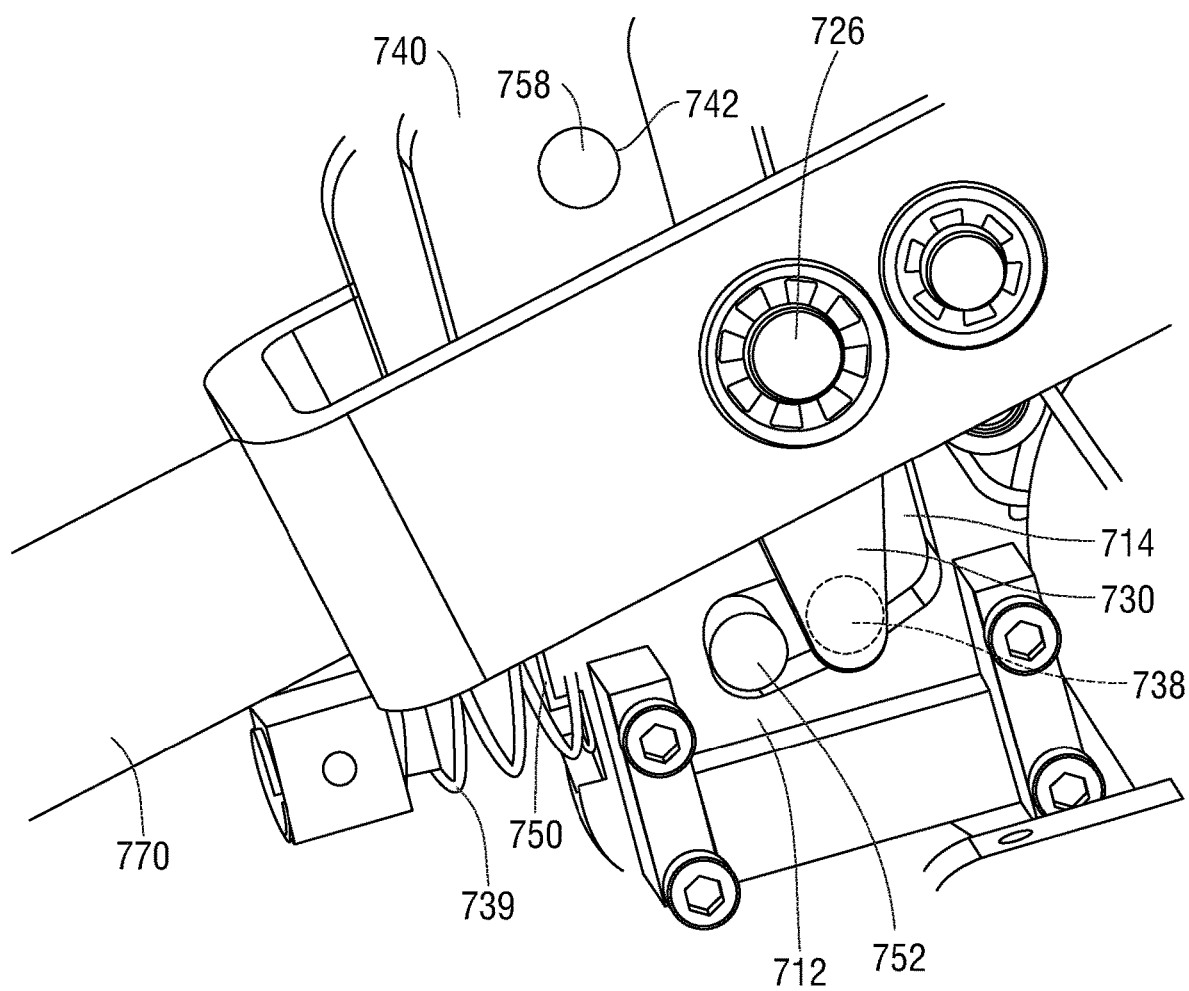
FIG. 10 is an enlarged, perspective view of a portion of the caster locking mechanism of FIG. 9 illustrating the internal operable couplings between the components thereof.
Figure 11:
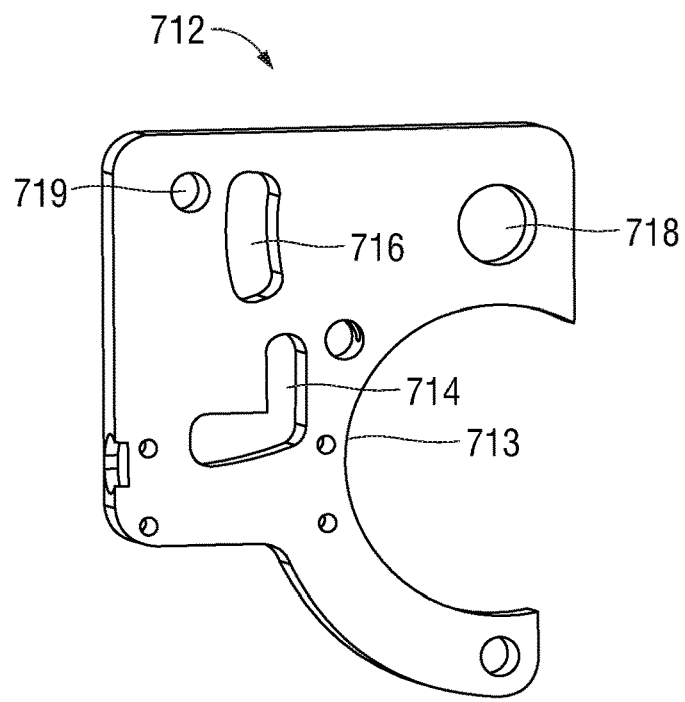
FIG. 11 is a perspective view of the guide plate of the caster locking mechanism of FIG. 9.

Referring to FIGS. 9-11, guide plate 712 defines a semi-circular cut-out 713 configured to at least partially receive the base bar 340 of the corresponding leg assembly 300 (FIG. 1). Base bar 340 may be secured within semi-circular cut-out 713 via welding, mechanical fastening, or in any other suitable fashion. Guide plate 712 further defines an L-shaped slot 714, a guide slot 716, a first aperture 718, and a second aperture 719.

Figure 12:
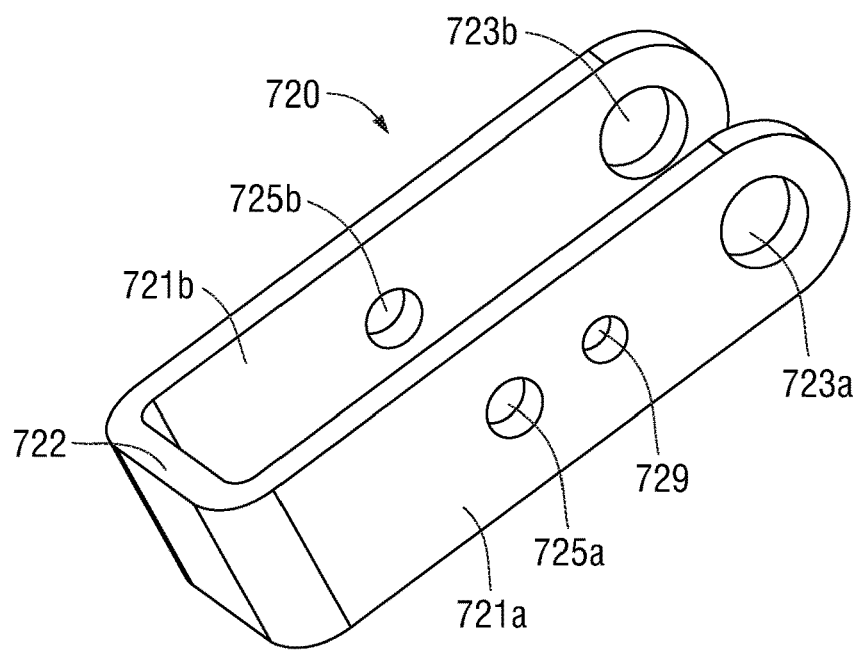
FIG. 12 is a perspective view of the yoke of the caster locking mechanism of FIG. 9.

With additional reference to FIG. 12, yoke 720 defines a generally U-shaped configuration including a pair of spaced-apart flanges 721a, 721b interconnected at fixed ends thereof by a base 722. An end of lock bar 770 is secured to base 722, e.g., via welding or other suitable engagement, and extends transversely outwardly therefrom. Each flange 721a, 721b defines a first aperture 723a, 723b towards the free end thereof. First apertures 723a, 723b are aligned with one another and first aperture 718 of guide plate 712 so as to enable receipt of a pivot pin 724 therethrough to pivotably couple yoke 720 and, thus, lock bar 770, with guide plate 712. Each flange 721a, 721b of yoke 720 further defines a second aperture 725a, 725b towards the free end thereof. Second apertures 725a, 725b are aligned with one another and guide slot 716 of guide plate 712 so as to enable receipt of a guide pin 726 therethrough. As a result of this configuration, the range of motion of yoke 720 as it pivots about pivot pin 724 relative to guide plate 712 is limited by the range of motion of guide pin 726 through guide slot 716. More specifically, when guide pin 726 is disposed at an upper end of guide slot 716, yoke 720 and, thus, lock bar 770 are disposed in an unlocked position, and when guide pin 726 is disposed at a lower end of guide slot 716, yoke 720 and, thus, lock bar 770 are disposed in a locked position. A torsion spring 728 is positioned about pivot pin 724 so as to bias yoke 720 and lock bar 770 towards the unlocked position, although other biasing configurations and/or biasing members are also contemplated.

Referring also to FIG. 13, rocker 730 includes a body 732 defining a first end 734a and a second end 734b. An aperture 736 is defined at first end 734a of rocker 730. Aperture 736 is configured to receive guide pin 726 which to pivotably couple first end 734a of rocker 730 with yoke 720 and slidably and pivotably couple rocker 730 with guide plate 712. As a result of this configuration, pivoting of lock bar 770 and, thus, yoke 720 towards the locked position relative to guide plate 712 drives rocker 730 downwardly. Second end 734b of rocker 730 includes a protrusion 738 extending outwardly therefrom. Rocker 730 is positioned adjacent guide plate 712 such that protrusion 738 is operably disposed within L-shaped slot 714 of guide plate 712. Upon movement of yoke 720 towards the locked position to drive rocker 730 downwardly, protrusion 738 is translated downwardly along the vertical portion of L-shaped slot 714. Upon reaching the locked position of yoke 720, protrusion 738 is positioned at the intersection of the vertical and horizontal portions of L-shaped slot 714. A biasing member 739 is positioned to bias rocker 730 towards the closed end of the horizontal portion of L-shaped slot 714 such that, upon protrusion 738 reaching the intersection of the vertical and horizontal portions of L-shaped slot 714, protrusion 738 is biased into the horizontal portion of L-shaped slot 714, thereby retaining rocker 730 in a lowered position and lock bar 770 and yoke 720 in the locked position.

With additional reference to FIG. 14, leg 740 of lock and release assembly 710 is generally vertically oriented and defines an aperture 742 at the upper end thereof that is configured to pivotably receive guide pin 726, which, as mentioned above, also pivotably couples rocker 730 with yoke 720 and guide plate 712. As such, upon movement of lock bar 770 and, thus, yoke 720 towards the locked position, both rocker 730 and leg 740 are driven downwardly. Leg 740 is configured to fixedly engage engagement foot 760 of locking mechanism 700 such that downward driving of leg 740 effects corresponding downward driving of engagement foot 760. More specifically, due to the above-detailed interconnections, upon pivoting of lock bar 770 towards the locked position, yoke 720 is likewise pivoted to thereby drive rocker 730 and leg 740 downwardly, which moves engagement foot 760 from a retracted position, wherein engagement foot 760 is spaced-apart from the supporting surface, e.g., floor, upon which the corresponding caster assembly 600 (FIG. 1) sits, to an extended position, wherein engagement foot 760 is urged into contact with the supporting surface, e.g., floor, to raise the corresponding caster assembly 600 (FIG. 1) off the floor and lock bed 10 (FIG. 1) in position. Biasing of protrusion 738 of rocker 730 into the horizontal portion of L-shaped slot 714, as detailed above, thus locks engagement foot 760 in the extended position upon pivoting of lock bar 770 to the locked position.

Referring also to FIG. 15, a release member 750 extends from either end of release bar 780 into operable engagement with the corresponding lock and release assembly 710. More specifically, release member 750 defines an L-shaped configuration having a protrusion 752 extending outwardly in a transverse direction from an elbow 754 of release member 750, and an aperture 756 disposed at a free end of release member 750. Release member 750 is positioned relative to guide plate 712 such that protrusion 752 extends into L-shaped slot 714 of guide plate 712 and such that aperture 756 of release member 750 and second aperture 719 of guide plate 712 are aligned with one another. A pivot pin 758 extends through aperture 756 and second aperture 719 to pivotably couple release member 750 and, thus, release bar 780 relative to guide plate 712. A biasing member (not explicitly shown) biases release bar 780 towards an initial position, wherein protrusion 752 is disposed at the closed end of the horizontal portion of L-shaped slot 714 of guide plate 712. Upon downward urging of release bar 780 towards a release position, release member 750 is rotated relative to guide plate such that protrusion 752 is translated through the horizontal portion of L-shaped slot 714. If engagement foot 760 is disposed in the extended position when release bar 780 is moved to the release position, protrusion 752 is translated through the horizontal portion of L-shaped slot 714 into contact with protrusion 738 of rocker 730 ultimately such that protrusion 738 is returned to the vertical portion of L-shaped slot 714 and, thereafter, biased upwardly through the vertical portion of L-shaped slot 714 to return engagement foot 760 to the retracted position and lock bar 770 to the unlocked position. Upon release of release bar 780, the biasing member (not explicitly shown) biases release bar 780 back towards the initial position.

The above description, disclosure, and figures should not be construed as limiting, but merely as exemplary of particular embodiments. It is to be understood, therefore, that the disclosure is not limited to the precise embodiments described, and that various other changes and modifications may be effected by one skilled in the art without departing from the scope or spirit of the present disclosure. Additionally, persons skilled in the art will appreciate that the features illustrated or described in connection with one embodiment may be combined with those of another, and that such modifications and variations are also intended to be included within the scope of the present disclosure. Therefore, the above description should not be construed as limiting, but merely as exemplifications of particular embodiments.

What is claimed is:

1. A patient care bed, comprising:
   a fixed frame defining a head end and a foot end;
   first and second leg assemblies coupled to the head end and foot end, respectively, of the fixed frame, each leg assembly including a pair of spaced-apart caster assemblies configured to support the leg assembly on a support surface;
   an engagement foot associated with each of the caster assemblies of the first leg assembly or the second leg assembly, each engagement foot movable between a retracted position and an extended position for lifting the corresponding caster assembly off of the support surface;
   a lock and release assembly associated with each engagement foot;
   a lock bar operably coupled to and extending between the lock and release assemblies, the lock bar movable in a first direction from an unlocked position to a locked position to move the engagement feet from the retracted position to the extended position; and
   a release bar operably coupled to and extending between the lock and release assemblies, the release bar movable in the first direction from an initial position to a release position to move the engagement feet from the extended position back to the retracted position.

2. The patient care bed according to claim 1, wherein each lock and release assembly includes:
   a guide plate defining an lock and release slot;
   a rocker including a protrusion slidably disposed within the lock and release slot, the rocker operably coupled to the lock bar such that moving the lock bar from the unlocked position to the locked position slides the protrusion of the rocker through the lock and release slot from a first position to a second position to lock the lock bar in the locked position and the engagement feet in the extended position; and
   a release member including a protrusion slidably disposed within the lock and release slot, the release member operably coupled to the release bar such that movement of the release bar from the initial position to the release position slides the protrusion of the release member through the lock and release slot and into contact with the protrusion of the rocker to urge the protrusion of the rocker from the second position back to the first position, thereby returning the lock bar to the unlocked position and the engagement feet to the retracted position.

3. The patient care bed according to claim 2, wherein the lock and release slot of each lock and release assembly defines a L-shaped configuration having a vertical portion and a horizontal portion, and wherein, moving the lock bar from the unlocked position to the locked position slides the protrusion of the rocker of each lock and release assembly from a closed end of the vertical portion of the corresponding lock and release slot, through the vertical portion of the corresponding lock and release slot, and into the horizontal portion of the corresponding lock and release slot to lock the lock bar in the locked position and the engagement feet in the extended position.

4. The patient care bed according to claim 3, wherein movement of the release bar from the initial position to the release position slides the protrusion of the release member of each lock and release assembly from a closed end of the horizontal portion of the corresponding lock and release slot through the horizontal portion of the corresponding lock and release slot and into contact with the protrusion of the corresponding rocker to urge the protrusion of the corresponding rocker from the horizontal portion of the corresponding lock and release slot to the vertical portion of the corresponding lock and release slot, thereby returning the lock bar to the unlocked position and the engagement feet to the retracted position.

5. The patient care bed according to claim 4, wherein, the lock bar is biased towards the unlocked position such that the protrusion of the rocker of each lock and release assembly is biased towards the closed end of the vertical portion of the corresponding lock and release slot once disposed within the vertical portion of the corresponding lock and release slot, thereby returning the lock bar to the unlocked position and the engagement feet to the retracted position once the protrusion of the corresponding rocker is disposed in the vertical portion of the corresponding lock and release slot.

6. The patient care bed according to claim 2, wherein the each lock and release assembly further includes a yoke disposed at an end of the lock bar and pivotably coupled to the corresponding guide plate at a first location along the yoke via a first pin.

7. The patient care bed according to claim 6, wherein the each lock and release assembly further includes a second pin pivotably coupled to the yoke at a second location along the yoke, the second pin slidably disposed within a guide slot defined within the corresponding guide plate.

8. The patient care bed according to claim 7, wherein the rocker of each lock and release assembly is pivotably coupled to the corresponding yoke at the second location along the yoke via the second pin.

9. The patient care bed according to claim 7, wherein each lock and release assembly further includes a leg defining a first end and a second end, the first end of the leg pivotably coupled to the corresponding yoke at the second location along the yoke via the second pin, the second end of the leg coupled to the corresponding engagement foot.

10. A patient care bed, comprising:
    a fixed frame defining a head end and a foot end;
    first and second leg assemblies coupled to the head end and foot end, respectively, of the fixed frame, each leg assembly including a pair of spaced-apart caster assemblies configured to support the leg assembly on a support surface;
    an engagement foot associated with each of the caster assemblies of the first leg assembly or the second leg assembly, each engagement foot movable between a retracted position and an extended position for lifting the corresponding caster assembly off of the support surface;
    a lock bar operably coupled to and extending between the engagement feet, the lock bar movable in a first direction from an unlocked position to a locked position to move the engagement feet from the retracted position to the extended position; and
    a release bar operably coupled to and extending between the engagement feet, the release bar movable in the first direction from an initial position to a release position to move the engagement feet from the extended position back to the retracted position.

* * * * *